UNITED STATES PATENT OFFICE.

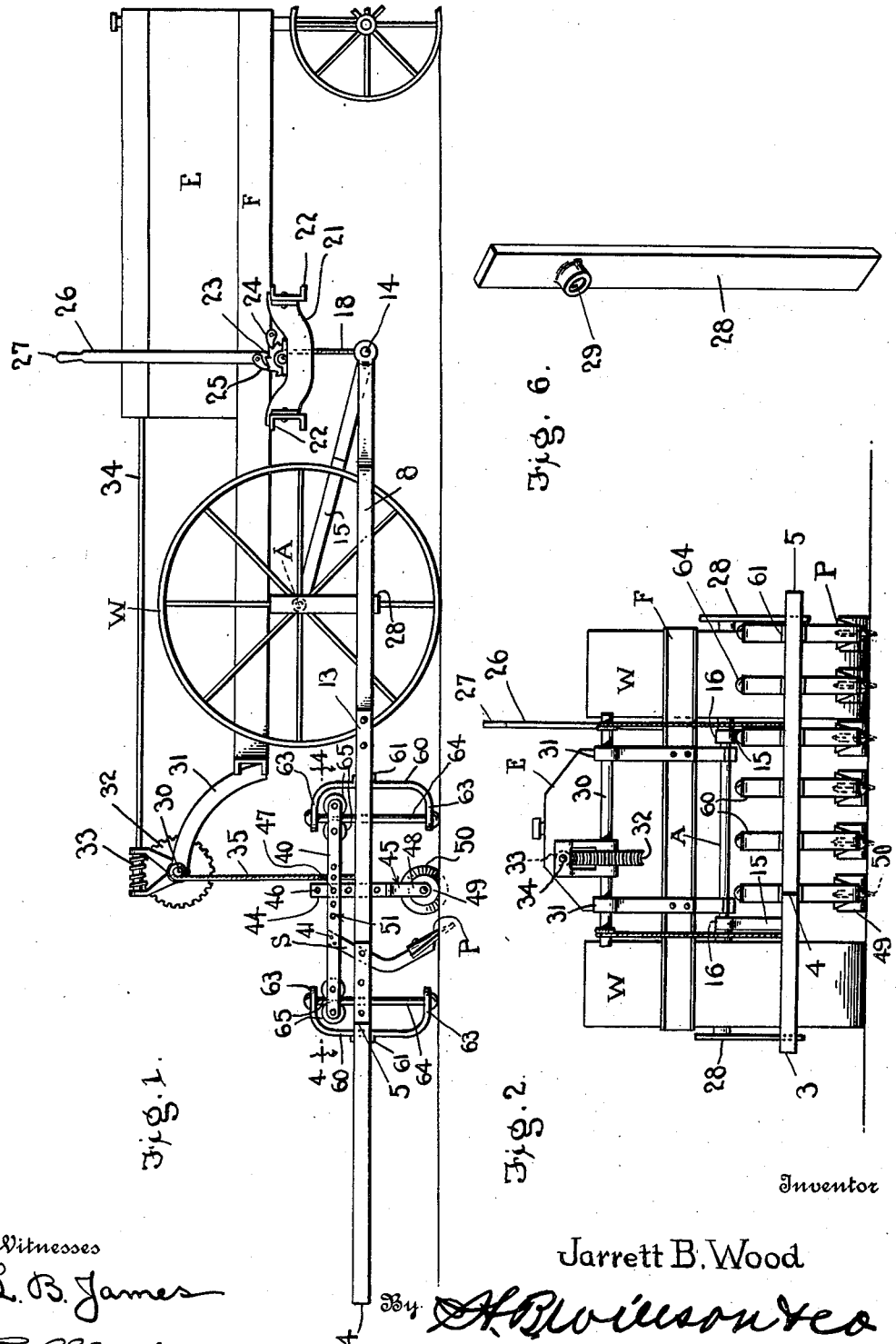

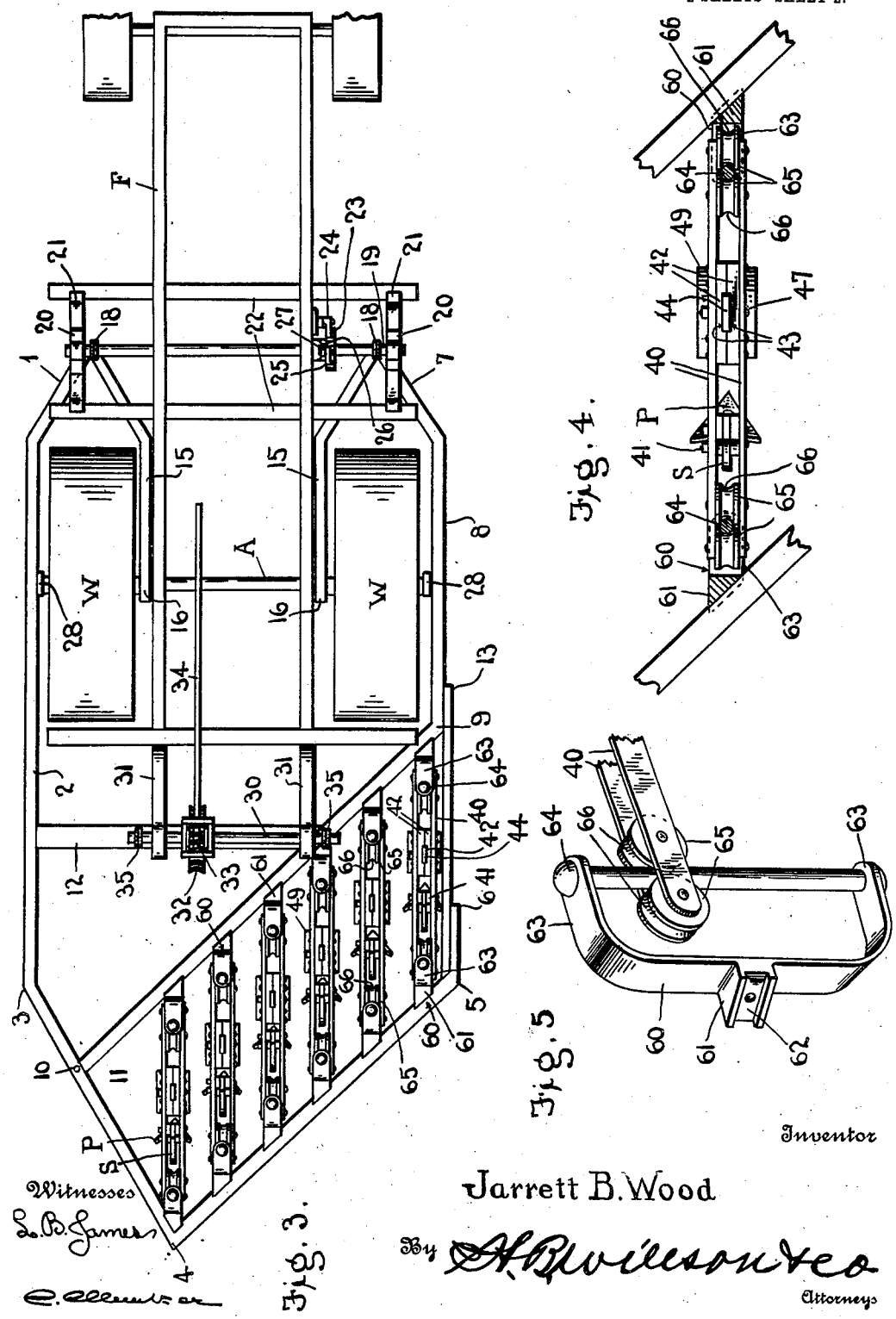

JARRETT B. WOOD, OF CHATTANOOGA, TENNESSEE.

PLOW.

1,087,205.  Specification of Letters Patent.  Patented Feb. 17, 1914.

Application filed December 30, 1912. Serial No. 739,394.

*To all whom it may concern:*

Be it known that I, JARRETT B. WOOD, a citizen of the United States, residing at Chattanooga, in the county of Hamilton and State of Tennessee, have invented certain new and useful Improvements in Plows; and I do declare the following to be a full, clear, and exact description of the invention, such as will enable others skilled in the art to which it appertains to make and use the same.

This invention relates to plows, and more especially to gang plows which are drawn by power; and the object of the same is to produce improved means for permitting the adjustment of the draft bar or frame at its front or rear ends or both, and for raising the gang of plows out of the ground when the rear end of this bar is adjusted to a sufficient height.

In attaining these objects the invention consists in certain details of construction hereinafter more fully described and claimed, and as shown in the drawings wherein—

Figure 1 is a side elevation of this machine, showing only the nearest of the gang of plows, Fig. 2 is a rear elevation showing a gang of six plows, and Fig. 3 a plan view thereof; Fig. 4 is an enlarged plan view of one of the plows of the gang and its supports, being taken on a section line 4—4 of Fig. 1; Fig. 5 is an enlarged perspective detail of one of the clevises and the guide therein for said supports; Fig. 6 is a perspective detail of one of the fenders at the extremities of the main axle.

The draft mechanism employed in the present invention is a motor vehicle diagrammatically illustrated and comprising any suitable form of engine E mounted on a frame F supported on wheels W by means of an axle A, and further illustration and description is unnecessary. The gang of plows (six are shown in the gang herein) have plow points P and standards S of any suitable construction, the standards being carried by what might be called beams whose construction is part of the present invention. Otherwise the elements hereinbefore mentioned may be of any suitable type.

Coming now more particularly to the details, the draft bar or frame is by preference substantially U-shaped in plan view as best seen in Fig. 3, the whole being disposed beneath the framework F of the draft mechanism as will be seen from Fig. 1, and adjustably supported therefrom by means hereinafter more fully described. This frame is by preference of angle iron, and may well be made as follows: Beginning at the point 1 in Fig. 3, it leads obliquely outward outside the left wheel W and to the rear as at 2, is then deflected slightly inward as at 3 and extends to the rearmost point 4, there it makes a sharp angle and extends obliquely forward to point 5, and then extends straight forward to the point 6. Beginning now at the point 7, opposite the point 1, the right hand portion of this draft frame leads obliquely outward, past the right hand wheel W as at 8, then bends inward at the point 9 and leads across within the loop formed by the first-mentioned member between the points 3, 4, and 5, and is connected therewith as at 10, thereby leaving an obliquely disposed space 11 for the gang of plows as described below. Finally a transverse brace 12 may connect the two members of this frame as shown, and a longitudinal bar 13 may connect the right hand member 8 with the forward right hand end 6 of the left hand member as also shown. A cross rod 14 unites the front ends of the two members at 1 and 7, and two push rods 15 are pivotally mounted at their rear ends at 16 on the axle A and at their front ends on the cross rod, so that when the machine is propelled forward by suitable power the main axle through the push rods will drive the draft frame along with it.

The front adjusting mechanism includes a pair of flexible connections such as chains 18 rising from the cross rod 14 and wound on a windlass or drum 19 whose shaft is mounted in bearings 20 carried on bars 21 whose extremities are supported by means of beams 22 running across beneath the main frame F. Fast on the windlass shaft or drum is a ratchet wheel 23 engaged by a retaining pawl 24 and by a second pawl 25 pivoted to a hand lever 26 which latter is mounted at its lower end loosely on the shaft and its upper end has a handle 27. When this handle is moved to and fro, the windlass winds up on the chains 18, and the cross rod 14 and the front end of the draft bar are elevated, when both pawls are raised, the windlass is permitted to unwind the chains 18 so that the cross rod 14 and the front end of the draft descend. In the rise and fall of this cross rod the push bars 15 swing around the main axle A, and the forward progress of the motor drives this rod through the push bars whether said rod is adjusted high or low.

In order that the draft frame may not strike against the wheels W, I make use of a fender best illustrated in Fig. 6, the same consisting of an upright bar 28 having an eye 29 which is mounted on the extremity of the axle so that the bar lies beyond the wheel and the side bars of the draft frame may rest against and move up and down on these upright bars 28, yet they will never be struck by the rim of the wheels.

The mechanism for adjusting the rear portion of the draft bar consists of a windlass whose drum or shaft 30 is mounted in bearings 31 rising from the main frame F and carries a worm wheel 32, and a worm 33 engaging this wheel is fast on a shaft 34 leading forward to within reach of the operator or to a point where it may be connected with the engine E so that it may be turned by mechanical power. Obviously when this shaft 34 is rotated, the windlass drum 30 is turned in either direction desired. From this drum depend two flexible connections or chains 35 whose lower ends are attached to any proper portion of the draft frame, such as the oblique rear end of the right hand member and the brace 12 as seen in Fig. 3, although I do not wish to be limited in this respect. Thus it will be seen that, while the push rods 15 cause the cross rod 14 and the front end of the draft frame to move forward with the machine, whether said front end is adjusted high or low, the rear end of the frame is adjusted in a manner entirely independent from the adjustments of the front end; and as said rear end carries the gang of plows which are quite heavy, in practice the rear windlass will probably be operated by mechanical connections with the source of energy such as the engine E.

The gang of plows is disposed within the space 11 at the rear end of the draft frame, as best seen in Fig. 3, and in the drawings I have shown six duplicate members as constituting the gang, although of course there may be a greater or less number thereof.
The details of the plow point and its shape, and its standard and manner of attachment, form no part of the present invention; but the plow beam 40 is preferably made double as best seen in Fig. 4, and the upper end of the standard S is bolted between the members of the beam as at 41. Forward of this point are spacing blocks 42 having registering notches 43 in their meeting edges, and through these notches passes the upright stem 44 of a forked standard 45 having perforations 46 through its body adapted to receive a bolt 47 which passes through said blocks 42, whereby the standard may be adjusted high or low. Within the fork 48 of this standard is pivoted a wheel 49 which travels on the surface of the earth, and this wheel by preference has a cutting edge 50 around it between its ends, so that the soil is slitted in advance of the plow point P for the purpose of rendering the work of the latter easy in a manner well understood, and cutting through roots which otherwise might do injury to the point or its standard. The blocks 42 are bolted into some of a series of holes 51 through the side members 40 of the beam, and by adjusting the bolts into proper holes the blocks 42 can be set farther forward or rearward so that the standard and its wheel can be adjusted in relation to the plow P. Obviously by setting the bolt 47 in the proper hole through the standard, the height of the wheel can also be adjusted, so as to permit the plow point P to enter the ground to a greater or lesser degree. Ordinarily the flat face of the wheel 49 travels upon the ground and limits the extent to which the point will indent the same, and therefore these adjustments become of advantage when it is desired to plow deeper or shallower.

The means for supporting each plow within the space 11 of the draft frame consists of a pair of clevises 60 (see Fig. 5) whereof each has a U-shaped body with a bracket 61 at its mid-length having a beveled face 62 adapted to be bolted within the oblique members of the draft frame, and the upper and lower arms 63 of the clevis are connected by an upright bolt or rod 64 forming a guide on which the plow beam must move. For this purpose the members 40 of said beam pass astride said rod 64, and in front and in rear of it carry anti-friction rollers 65 having grooved peripheries 66 traveling on said rod as well seen in this view. With such a guide at both the front and rear ends of the plow beam, it is clear that the entire plow and all parts rigidly connected therewith may rise and fall as the surface of the earth causes the wheel 49 to rise and fall, therefore the plow point will indent the earth to only the desired extent, whether the surface is level or irregular. Ordinarily the rear end of the draft frame will be adjusted about as seen in Fig. 1, so that the clevises and guides travel almost if not quite fully in contact with the surface of the earth so as to permit the plow beam to descend to quite an extent in case the machine should pass over a gully or any individual plow should pass over a hole. In that event its wheel would drop into such gully or hole, the rollers 65 would travel downward on the rods 64, and the beam, standards, and plow point P would descend so that the latter would cut a furrow through these gullies just as well as it would cut a furrow on level ground.

In the use of this device, other than as gang plows are ordinarily employed, the operator by causing the rotation of the shaft 34 in one direction or the other may wind or unwind the rear windlass 30 so that the flexible connections or chains cause the rear end of the draft frame to rise or fall. When raised sufficiently high, it is quite obvious that the rollers 65 at both ends of each plow beam strike the lower arms 63 of the clevises 60 and the entire plow mechanism is thereby raised out of the ground and then out of contact with the ground; and this would be the position and condition of parts when the entire vehicle is to move from point to point. I will not further elaborate details, because that is unnecessary to a clear understanding of this invention.

What is claimed as new is:—

1. In a power-driven plow or the like, the combination with a motor vehicle whose framework has a main axle mounted on wheels, and a cross rod supported by the framework forward of said wheels; of the draft frame connected at its front ends with said rod, passing outside said wheels, and carrying the earth-engaging tools, and fenders for the wheels, each consisting of an upright bar having an eye secured to one extremity of the axle so that the bar stands inside the side of said draft frame, for the purpose set forth.

2. In a power-driven plow, the combination with a motor vehicle whose framework has a rear axle mounted on wheels, a cross rod forward of said wheels, and push rods pivotally connected at their rear ends to said axle and at their front ends to said rods; of means for adjusting the rod vertically, a draft frame connected at its front end with this rod, and the earth-engaging tools carried by said draft frame.

3. In a power-driven plow, the combination with a motor vehicle whose framework has a rear axle mounted on wheels, a cross rod forward of said wheels, and push rods pivotally connected at their rear ends to said axle and at their front ends to said rod; of means for adjusting the rod vertically, a draft frame connected at its front end with this rod, the earth-engaging tools carried by said draft frame, and means for adjusting the rear end of said frame vertically, for the purpose set forth.

4. In a power driven plow, the combination with a motor vehicle, two elevating devices thereon, and means for actuating them independently of each other; of a draft frame whose front end is connected to a cross rod and whose rear end carries a cross brace, push rods between said cross rod and one of the axles of the motor vehicle frame for propelling the draft frame, chains leading upward from said cross rod and cross brace respectively to the elevating devices above them.

In testimony whereof I have hereunto set my hand in presence of two subscribing witnesses.

JARRETT B. WOOD.

Witnesses:
 BEN VOSZ,
 W. McDONALD.